United States Patent
Anderson, Jr.

(10) Patent No.: US 9,949,496 B2
(45) Date of Patent: Apr. 24, 2018

(54) CRAB CRACKING TOOL

(71) Applicant: Theodore Anderson, Jr., Memphis, TN (US)

(72) Inventor: Theodore Anderson, Jr., Memphis, TN (US)

( * ) Notice: Subject to any disclaimer, the term of this patent is extended or adjusted under 35 U.S.C. 154(b) by 0 days.

(21) Appl. No.: 15/702,939

(22) Filed: Sep. 13, 2017

(65) Prior Publication Data

US 2018/0070600 A1 Mar. 15, 2018

Related U.S. Application Data

(60) Provisional application No. 62/394,488, filed on Sep. 14, 2016.

(51) Int. Cl.
*A22C 29/02* (2006.01)
*A47J 43/28* (2006.01)

(52) U.S. Cl.
CPC ............ *A22C 29/027* (2013.01); *A47J 43/28* (2013.01)

(58) Field of Classification Search
CPC ... B25F 1/003; B25B 7/00; B25B 7/22; B25B 7/08; B26B 13/22
USPC ............... 452/1–6, 16, 17; 7/158, 132, 106; 30/120.1–120.5, 173, 194, 244, 254, 137, 30/147; 81/415, 418, 424.5, 426.5
See application file for complete search history.

(56) References Cited

U.S. PATENT DOCUMENTS

| | | | | | |
|---|---|---|---|---|---|
| 414,457 | A | * | 11/1889 | Storer | A01D 9/00 30/254 |
| 460,438 | A | * | 9/1891 | Haunty | B25B 7/22 254/26 R |
| 508,355 | A | * | 11/1893 | Streeter et al. | A47J 43/26 30/120.3 |
| 591,720 | A | * | 10/1897 | Armstrong | B25B 7/02 7/131 |
| 890,327 | A | * | 6/1908 | Blum | B25L 7/02 30/102 |
| 1,134,177 | A | * | 4/1915 | Bernard | B25B 7/02 254/22 |
| 1,176,604 | A | * | 3/1916 | Sanders | B25B 7/02 294/99.2 |
| 2,260,884 | A | * | 10/1941 | Clinton | A01G 3/02 30/254 |
| 2,378,084 | A | * | 6/1945 | Jackson | A47J 43/26 30/120.3 |

(Continued)

*Primary Examiner* — Richard T Price, Jr.
(74) *Attorney, Agent, or Firm* — Global Intellectual Property Agency, LLC; Jordan Sworen

(57) ABSTRACT

A crab cracking tool. The crab cracking tool includes a first member having a first handle connected to a first head portion and a second member having a second handle connected to a second head portion. The first head portion includes a first recess, a second recess, and a first gripping portion and the second head portion includes a third recess, a fourth recess, and a second gripping portion. A cutting tool disposed on the second member extends outwardly from a first end of the second head portion. The cutting tool includes an inner edge having a blade thereon. The inner edge is oriented inwardly toward an outer side of the second member defining an opening therebetween. The first member is pivotally secured to the second member, such that the first second members are configured to pivot between a closed position and an open position.

10 Claims, 2 Drawing Sheets

(56) References Cited

U.S. PATENT DOCUMENTS

| | | | | |
|---|---|---|---|---|
| 2,454,601 A * | 11/1948 | Gallagher | A47J 43/26 | |
| | | | 30/120.4 | |
| 2,539,849 A * | 1/1951 | Lum | A47G 21/023 | |
| | | | 294/61 | |
| 2,542,600 A * | 2/1951 | Vaccarezza | A47G 21/06 | |
| | | | 30/147 | |
| 2,618,994 A * | 11/1952 | Frazee | A01K 95/02 | |
| | | | 7/132 | |
| 3,220,241 A * | 11/1965 | Miller | H01R 43/015 | |
| | | | 7/107 | |
| 3,293,673 A * | 12/1966 | Olney | B25C 11/02 | |
| | | | 254/28 | |
| 4,200,961 A * | 5/1980 | Mueller | A22C 29/024 | |
| | | | 30/120.1 | |
| 4,709,206 A * | 11/1987 | Edwards | G01R 1/06788 | |
| | | | 324/72.5 | |
| 4,716,627 A | 1/1988 | Scott | | |
| 5,063,770 A * | 11/1991 | Chen | H01R 43/0421 | |
| | | | 140/106 | |
| 5,732,461 A * | 3/1998 | Keffeler | B25B 7/02 | |
| | | | 29/268 | |
| 5,862,552 A * | 1/1999 | Koelewyn | A01K 97/00 | |
| | | | 7/132 | |
| 5,893,303 A * | 4/1999 | Harris | B25L 7/00 | |
| | | | 81/300 | |
| 6,817,937 B1 | 11/2004 | Merritt | | |
| 7,112,129 B2 * | 9/2006 | Zimbone | A22C 29/024 | |
| | | | 452/6 | |
| 7,249,390 B2 * | 7/2007 | Yale | B25F 1/02 | |
| | | | 30/156 | |
| 7,258,603 B1 * | 8/2007 | Martin | A22C 29/024 | |
| | | | 452/6 | |
| 7,621,803 B2 | 11/2009 | Martin | | |
| 8,959,777 B2 * | 2/2015 | Forman | B26B 13/06 | |
| | | | 30/146 | |
| 2004/0211066 A1 | 10/2004 | Horng | | |

\* cited by examiner

CRAB CRACKING TOOL

CROSS REFERENCE TO RELATED APPLICATIONS

This application claims the benefit of U.S. Provisional Application No. 62/394,488 filed on Sep. 14, 2016. The above identified patent application is herein incorporated by reference in its entirety to provide continuity of disclosure.

FIELD OF THE INVENTION

The present invention relates to food utensils and tools. More specifically, the present invention provides a crab cracking tool configured to easily prepare a cooked crab or other crustacean for consumption.

BACKGROUND OF THE INVENTION

Many individuals enjoy cooking and consuming crabs and other types of crustaceans. In order to extract the meat of the crustacean, the individual must first crack the outer shell. It can be difficult to open a crustacean shell without the proper tool, and it can take a significant amount of time and effort to reach the meat within the shell. Conventional crab cracking tools allow individuals to crack crustacean shells, but do not allow for different options when cracking shells of different sizes and thicknesses. Even with a conventional crab cracking tool, it can be difficult to retrieve the meat from the thinner leg portions. Cracking the shell can also damage the meat inside, which may be undesirable. In view of the above, it is necessary to provide a crab cracking tool that includes a cutting tool for easily cutting through the shell to retrieve meat, as well as different diameter openings for effectively cracking shells of different sizes and thicknesses.

Devices have been disclosed in the known art that relate to crab cracking tools. These include devices that have been patented and published in patent application publications. However, the devices in the known art have several drawbacks. These devices typically only utilize a single opening that can only receive a single size crab or crustacean leg. Further, these devices fail to provide a cutting tool for cutting through the meat or through the softer portions of the shell.

In light of the devices disclosed in the prior art, it is submitted that the present invention substantially diverges in design elements from the known art and consequently it is clear that there is a need in the art for an improvement to existing crab cracking tools. In this regard the present invention substantially fulfills these needs.

SUMMARY OF THE INVENTION

In view of the foregoing disadvantages inherent in the known types of crab cracking tools now present in the prior art, the present invention provides a crab cracking tool wherein the same can be utilized for providing convenience for the user when cracking open crabs and other crustaceans. The crab cracking tool comprises a first member comprising a first handle connected to a first head portion, the first head portion comprising a first recess, a second recess, and a first gripping portion, and a second member comprising a second handle connected to a second head portion, the second head portion comprising a third recess, a fourth recess, and a second gripping portion. A cutting tool is disposed on the second member, the cutting tool extending outwardly from a first end of the second head portion, the cutting tool comprising an inner edge having a blade thereon, wherein the inner edge is oriented inwardly toward an outer side of the second member defining an opening therebetween. The first member is pivotally secured to the second member, such that the first member and the second member are configured to pivot between a closed position and an open position.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
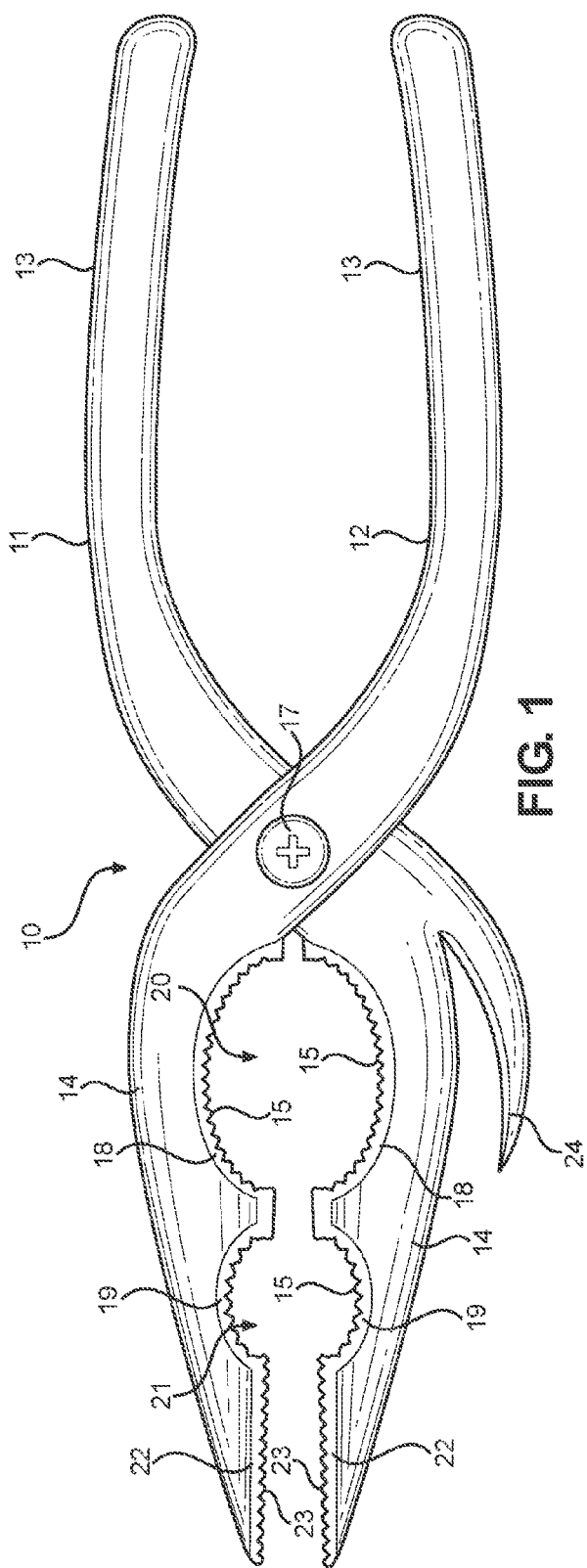
FIG. 1 shows a side view of the crab cracking tool in a substantially closed position.

Reference is made herein to the attached drawings. Like reference numerals are used throughout the drawings to depict like or similar elements of the crab cracking tool. For the purposes of presenting a brief and clear description of the present invention, the preferred embodiment will be discussed as used for cracking open crabs and other crustaceans. The figures are intended for representative purposes only and should not be considered to be limiting in any respect.

Referring now to FIG. 1, there is shown a side view of the crab cracking tool in a substantially closed position. The crab cracking tool 10 comprises a first member 11 pivotally connected to a second member 12. The first and second members 11, 12 are pivotally secured to one another at a pivot point 17, such that the first and second members 11, 12 are configured to pivot between a closed position and an open position. In one embodiment, the first and second members 11, 12 are composed of aluminum, stainless steel, or any other suitably durable and food-safe material. The first and second members 11, 12, further include a rounded profile that narrows from a distal end to the tip of the first and second members 11, 12.

The first and second member 11, 12 each comprise a handle 13 connected to a head portion 14. Each handle 13 is offset from its respective head portion 14. The head portions 14 contact one another when the first and second members 11, 12 are in the closed position. Each head portion comprises a first recess 18 and a second recess 19 adjacent thereto. A gripping portion 22 is disposed on a distal end of each of the head portions 14. The gripping portions 22 are utilized to grip a crustacean shell when the first and second members 11, 12 are moved toward the closed position. In some embodiments, the gripping portions 22 include a plurality of teeth 23 thereon that enable the shell to be tightly gripped. The second member 12 further comprises a cutting tool 24 thereon. The cutting tool 24 can be utilized to slice into the crustacean shell without damaging the meat. In the illustrated embodiment, the cutting tool 24 comprises an arcuate shape.

When the first and second members are in the closed position, a first opening 20 is formed between the first recesses 18, and a second opening 21 is formed between the second recesses 19. The first opening 20 has a diameter greater than a diameter of the second opening 21. Each recess 18, 19 includes a plurality of teeth 15 thereon which assist with gripping a shell. Each opening may be utilized to fit a corresponding sized portion of crab. The different sized openings allow the crab cracking tool 10 to be utilized effectively on shells of different sizes and thickness.

Figure 2:
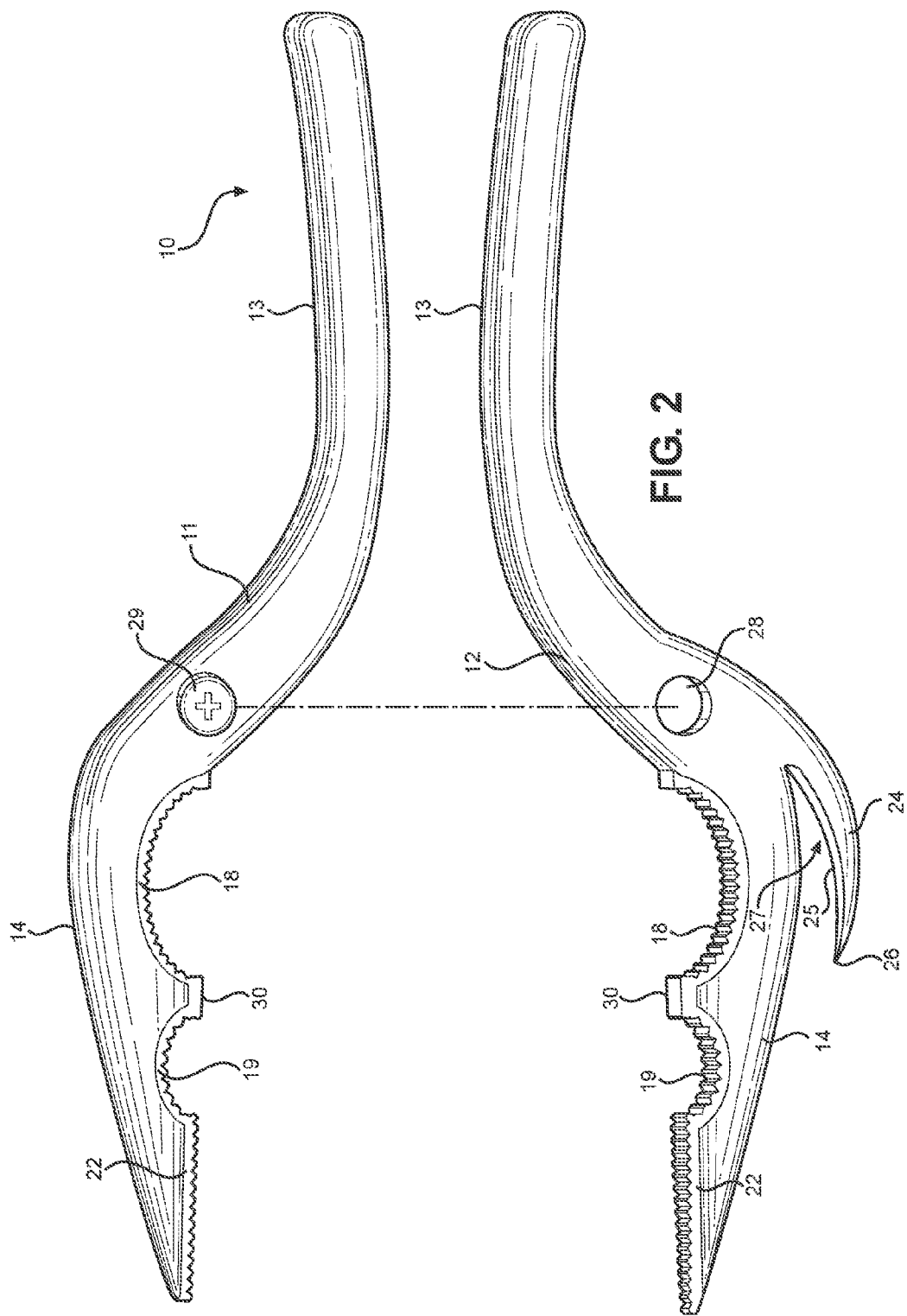
FIG. 2 shows an exploded view of the crab cracking tool.

Referring now to FIG. 2, there is shown an exploded view of the crab cracking tool. An aperture 28 is disposed on each of the first member 11 and the second member 12. The first and second members 11, 12 are positioned such that the apertures 28 align. A fastener 29 is inserted through each aperture 28 in order to pivotally secure the first member 11 to the second member 12. The fastener 29 can be a rivet, nut and bolt, or any other suitable fastener.

The cutting tool 24 disposed on the second member 12 comprises a blade 25 disposed on an inner edge thereof. An opening 27 is formed between the blade 25 and an outer side of the second member 12. The cutting tool 24 further comprises a pointed end 26. The pointed end 26 can be used to start an initial cut into a shell, while the blade edge 25 is used to slice down the length of the shell, exposing the meat therein without damaging the meat.

In the shown embodiment, a ridge 30 having a planar upper surface is disposed between the first and second recessed portions 18, 19 on each of the first and second members 11, 12. The ridges 30 contact one another such that they rest flush against each other when the first and second members 11, 12 are in the closed position, creating a barrier between the first and second recessed portions 18, 19 and their respective openings.

In use, a user may grip the handles 13 with one and hand hold a crab or other crustacean in the opposing hand. The user may utilize the gripping portions 22 to grip the shell or to create a large crack in the larger portions of the shell, while the cutting tool 24 can be utilized to cut into the thinner leg portions of the shell without crushing or damaging the meat therein. Additionally, the crab cracking tool 10 can be positioned such that a leg is inserted through either recessed area 18, 19 depending on its thickness. The crab cracking tool 10 can then be moved from the open position to the closed position, the force of which causes the shell to be cracked, thus exposing the meat therein. In this way, the crab cracking tool 10 provides a variety of means for reaching the meat within a crustacean shell.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A crab cracking tool, comprising:
    a first member comprising a first handle connected to a first head portion, the first head portion comprising a first recess, a second recess, and a first gripping portion;
    a second member comprising a second handle connected to a second head portion, the second head portion comprising a third recess, a fourth recess, and a second gripping portion;
    a cutting tool disposed on the second member, the cutting tool extending outwardly from the second head portion, the cutting tool comprising an inner edge having a blade thereon, wherein the inner edge is oriented inwardly toward an outer side of the second member defining an opening between the blade and the outer side;
    wherein the first member is pivotally secured to the second member;
    wherein the first member and the second member are configured to pivot between a closed position and an open position.

2. The crab cracking tool of claim 1, wherein the cutting tool comprises a pointed end.

3. The crab cracking tool of claim 1, wherein the first handle is offset from the first head portion, and wherein the second handle is offset from the second head portion.

4. The crab cracking tool of claim 1, further comprising:
    a first aperture disposed on the first member;
    a second aperture disposed on the second member;
    wherein the first member is pivotally secured to the second member via a fastener inserted through each of the first aperture and the second aperture.

5. The crab cracking tool of claim 1, further comprising:
    a first ridge disposed between the first recess and the second recess;
    a second ridge disposed between the third recess and the fourth recess.

6. The crab cracking tool of claim 5, wherein the first ridge and the second ridge make flush contact with one another when the first and second members are in the closed position.

7. The crab cracking tool of claim 1, wherein the cutting tool comprises an arcuate shape.

8. The crab cracking tool of claim 1, further comprising:
    a first opening formed by the first recess and the third recess when the first member and the second member are in the closed position;
    a second opening formed by the second recess and the fourth recess when the first member and the second member are in the closed position;
    wherein a diameter of the first opening is greater than a diameter of the second opening.

9. The crab cracking tool of claim 1, further comprising:
    a plurality of teeth disposed on each of the first recess, the second recess, the third recess, and the fourth recess.

10. The crab cracking tool of claim 1, further comprising:
    a plurality of teeth disposed on each of the first gripping portion and the second gripping portion.

* * * * *